United States Patent [19]

Chan et al.

[11] 3,839,635

[45] Oct. 1, 1974

[54] X-RAY DIFFRACTOMETER HAVING MEANS FOR COOLING CRYSTAL MOUNTED THEREON

[75] Inventors: Anthony P. H. Chan, Los Altos Hills; Arild Christensen, Sunnyvale, both of Calif.

[73] Assignee: Syntex (U.S.A.) Inc., Palo Alto, Calif.

[22] Filed: Oct. 10, 1973

[21] Appl. No.: 404,858

Related U.S. Application Data

[63] Continuation of application Ser. No. 282,151, Aug. 21, 1972, now abandoned.

[52] U.S. Cl. .............................. 250/443, 250/278

[51] Int. Cl. ...................................... G01n 23/20

[58] Field of Search ......... 250/271, 272, 278, 279, 250/437, 443

[56] References Cited

UNITED STATES PATENTS 3,112,398 11/1963 Shimula ........................ 250/272

OTHER PUBLICATIONS

Comptoir Commercial D'importation, Renaud et al. (1967), "Deep-cooling Device for Samples Down to the Temperature of Liquid Nitrogen to be Adapted to Diffraction Chambers and Diffractometers."

"Instruments and Techniques for Routine Studies of Organic Bodies Crystallyzing at Low Temperature" Renaud et al., Acta Cryst. (1967).

*Primary Examiner*—James W. Lawrence
*Assistant Examiner*—B. C. Anderson
*Attorney, Agent, or Firm*—William B. Walker, Esq.

[57] ABSTRACT

An X-ray diffractometer having cooling means, mounted on the full-circle portion of the goniometer assembly, for directing the flow of a cooling fluid about the mounted crystal. The cooling means is of such configuration that the longitudinal axis of the output member is always aligned in a fixed relationship, generally along, the $\phi$-axis on which the crystal is mounted. Such alignment enables the mounted crystal to be uniformly bathed in the flow of the cooling fluid whereby differential cooling of different portions of the mounted crystal is avoided.

25 Claims, 3 Drawing Figures

X-RAY DIFFRACTOMETER HAVING MEANS FOR COOLING CRYSTAL MOUNTED THEREON

This is a continuation of application Ser. No. 282,-151 filed Aug. 21, 1972, now abandoned.

FIELD OF THE INVENTION

This invention relates to X-ray diffractometers having means for cooling the crystal mounted thereon for analysis to temperatures below room temperature.

BACKGROUND OF THE INVENTION

Prior to this invention, it was heretofore known to cool a crystal mounted on the goniometer head of X-ray diffractometers by various techniques to temperatures below room temperature. In general, the mechanisms utilized to achieve such cooling have relatively complex structures which require that the mounted crystal be maintained in a totally enclosed chamber (thus limiting external access to the mounted crystal), and/or require the flow of a cooling liquid therethrough.

In one particular prior art device, an attachment is mounted on the full-circle goniometer assembly of the X-ray diffractometer for the purpose of reducing the temperature of the crystal by flowing a cooling fluid about the crystal. This device, however, terminates in an enclosure surrounding the mounted crystal. The enclosure makes realignment of the mounted crystal after initiation of the cooling operation more difficult, such realignment being necessary to compensate for the dimensional changes due to the lowering of the temperature of the crystal, and its supporting member, below ambient temperature. The enclosure also prevents visual observation of the growth of a crystal from a liquid phase as the liquid is cooled. In addition, the transfer line and its associated components are of such weight and configuration as to limit movement of the goniometer assembly about its various axes. This, in an absolute sense, restricts data collection since the goniometer assembly cannot be moved to potentially desirable positions.

In a further prior art device, the flow of a cooling fluid is utilized to cool the mounted crystal below ambient temperature. However, the cooling means remains stationary as the crystal is rotated by the goniometer assembly, whereby the flow of the cooling fluid is directed against different surfaces of the crystal. The temperature variations in the crystal, which inherently result, affect the analytical data obtained to an undetermined, but undesirable, extent.

OBJECT OF THE INVENTION

It is, therefore, the primary object of this invention to provide a novel X-ray diffractometer combination including means associated therewith for cooling a crystal mounted thereon for analysis.

It is a further object of this invention to provide an X-ray diffractometer having means for cooling the crystal mounted thereon for analysis, such cooling means not requiring an enclosure about the mounted crystal and being of such design that the degree of movement of the goniometer assembly and, therefore, the degree of freedom of data collection, is not undesirably restricted.

These and still further objects, features, and advantages of the present invention will become apparent upon consideration of the following detailed disclosure.

BRIEF SUMMARY OF THE INVENTION

These and still further objects, features, and advantages of the present invention are achieved, in accordance therewith, by providing an X-ray diffractometer including a full-circle goniometer assembly having a goniometer head for holding and supporting a crystal to be analyzed; an X-ray source for directing a beam of X-radiation at the mounted crystal; detector means positioned to receive the diffracted X-ray beam for measuring the intensity thereof; and means, mounted on the full-circle portion of the goniometer assembly, for directing the flow of a cooling fluid about the crystal along the axis of the fiber or filament on which the crystal is mounted. The cooling means includes a stationary input member secured to the movable outer ring of the full-circle portion of the goniometer assembly and a output member secured to the movable inner ring of the full-circle portion of the goniometer assembly. By use of this configuration, fluid flow from the output port of the output member is at all times in a fixed relationship with the $\phi$-axis whereby, during cooling, the mounted crystal is uniformly bathed in the flow of the cooling fluid thereby avoiding differential cooling of different portions of the mounted crystal.

In a further aspect of this invention, adjacent members of the cooling means are held together by a gasket which not only permits desirable, and necessary, rotation of such members, but is of such configuration that undesirable frosting does not occur on the outside portions thereof. Specifically, the gasket, which essentially is of cylindrical design, has offset ridges on the inner and outer surfaces thereof. The ridges are offset to permit a certain degree of flexibility which enables the gasket to be deformed as the members to be held thereby are joined at ambient temperature. During cooling, the gasket as well as the associated components of the cooling means will contract slightly; however, because of the dimensional configuration of each gasket such contraction will only ease the degree of deformation whereby the joined members will still be tightly, but rotatably, held. In addition, adjacent ridges on each side of the gasket define annular pockets which serve to segment the overall temperature gradient (between ambient temperature and the temperature of the cooling fluid) into a plurality of smaller temperature gradients. In this manner, the temperature gradient between ambient temperature and the last annular pocket is reduced to a point where undesirable frosting on the outside surface of the gasket does not occur.

The cooling means associated with the X-ray diffractometer of the present invention is connected, via a supply conduit, to a source of the cooling fluid. For example, the cooling means can be connected to a source of liquid nitrogen or to a source of dry nitrogen gas. Whatever source is selected, it is essential, however, that the cooling fluid be dry as it flows about the mounted crystal, otherwise frosting will occur on the crystal which, quite obviously, is highly undesirable. When the cooling means is connected to a source of dry nitrogen gas, it is presently preferred to pass such dry gas through a heat exchanger immersed in a bath of liquid nitrogen, whereby the nitrogen gas, without coming in contact with other fluids, such as air, is cooled to the temperature of liquid nitrogen. The liquid nitrogen surrounding the heat exchanger can be connected to a source of liquid nitrogen, and sensors can be provided to insure that the heat exchanger is totally immersed in the liquid nitrogen at all times. The temperature of the cooling fluid as it exits from the outlet port of the cooling means can be regulated by providing a heating coil in the supply conduit between the heat exchanger and the above-described cooling means. By regulating the heat input to the heating coil, the temperature of the cooling fluid can be regulated between liquid nitrogen temperature and room temperature.

As the cooling fluid exits from the outlet port of the cooling means, it will, of course, come in contact with the humidified ambient atmosphere. There is the possibility that turbulent mixture of the cooling fluid and the humidified air will cause frosting to occur on the mounted crystal as well as on the outlet for the cold stream. To the extent that the flow rate of the cooling fluid as it exits from the outlet port cannot be adjusted to preclude frosting, an attachment is provided on the outlet end of the cooling means which can be connected, for example, to a source of dry nitrogen gas or dry air. The flow rate through this nozzle attachment is selected so that an annular sheath of dry gas surrounds the cooling fluid as it flows from the outlet port of the cooling means to and around the mounted crystal. In this manner, the moisture in the ambient atmosphere is excluded from the zone about the outlet port of the cooling means and the mounted crystal, whereby undesirable frosting does not occur. Optionally, this result can be achieved by placing the X-ray diffractometer of the present invention in an environmental chamber which is continually flushed with a dry gas, or by electrically heating the outer skin of the flowing cooling fluid stream.

BRIEF DESCRIPTION OF THE DRAWINGS

The foregoing and still further features and advantages of the present invention will become more apparent from the following detailed description, together with the accompanying drawings wherein:

Referring to FIG. 1, there is shown an X-ray diffractometer 10 having a base 12 on which there is mounted a goniometer assembly 14 and, in appropriate positions, a X-ray source 16 and a detector 18. Goniometer assembly 14 includes a base 20 on which there is mounted for rotation a full-circle 22 having outer ring 24 and movable inner ring 26. Mounted on movable inner ring 26 is a goniometer head 28 upon which a crystal to be analyzed can be mounted. Inner ring 26 is rotated by drive means, schematically shown at 30, and full-circle 22 can be rotated by rotating means, schematically shown at 32. As is well known in this art, goniometer head 28 can be rotated through 360°, inner ring 26 can be rotated through 360°, and the full circle 22 and the detector 18 can also be rotated, to thereby enable the beam of X-radiation to be directed at any point or plane on the surface of the crystal being analyzed. Goniometer assembly 14, and its associated drive mechanisms, X-ray source 16 and detector 18 are of conventional configuration well known to those skilled in this art and, accordingly, are only shown in schematic form.

Figure 3:
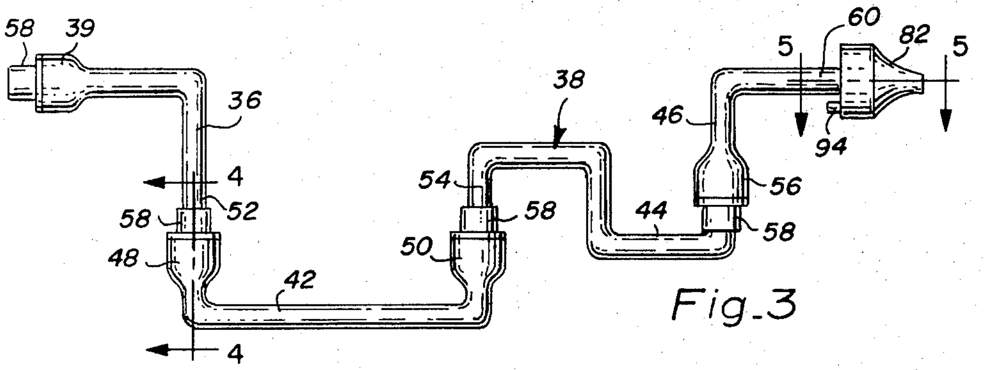
FIG. 3 is an elevational view of the embodiment of the cooling means shown in FIGS. 1 and 2.

Mounted on outer ring 24 of full-circle 22 by means of bracket 34 is the stationary input member 36 of cooling means 38. Input member 36 has one terminal end 39 adapted for connection to supply conduit 40. The other end of input member 36 is connected to intermediate two-bar linkage having first arm 42 which is connected, in turn, to second arm 44. The terminal end of second arm 44 is connected to output member 46 which by means of another bracket 48 is secured to movable inner ring 26. Each member or arm of cooling means 38, as shown in extended form in FIG. 3, is of double-wall (i.e., Dewar-type) construction. Input member 36, as indicated above, has an enlarged end 39 into which supply conduit 40, also of double-walled construction, is inserted. First arm 42 of the intermediate two-bar linkage has enlarged ends 48 and 50 which receive the smaller diameter end 52 of input member 36 and one end 54 of S-shaped arm 44, respectively. The other end of S-shaped arm 44 is inserted into the enlarged end 56 of output member 46. A rotatably tight fit, and thus a fluid-tight conduit path, is ensured by use of gasket or coupling members 58 adapted to receive each of the members to be joined together. The gasket or coupling member 58 can be constructed of any suitable material; however, it is presently preferred to use a self-lubricating material, such as Teflon, which does not require external lubrication and, therefore, will not add impurities which might be carried, by the cooling fluid, to the crystal being analyzed.

Figure 4:
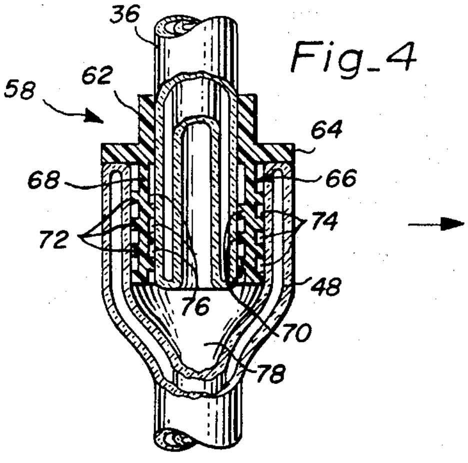
FIG. 4 is a cross-sectional view taken along line 4—4 of FIG. 3 showing the structure of one embodiment of a coupling which can be utilized to join two adjacent members of the cooling means.
Figure 7:
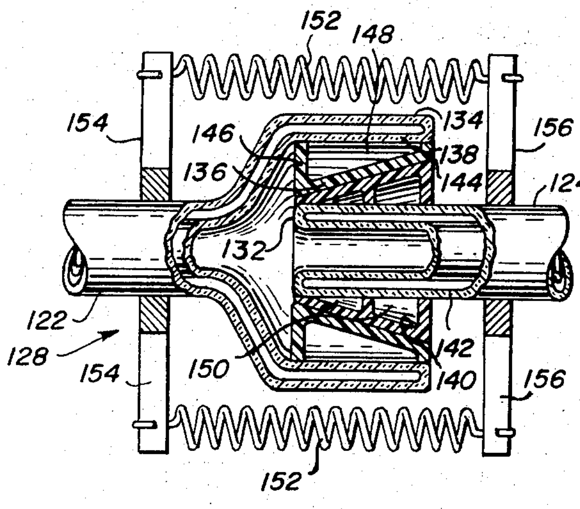
FIG. 7 is a cross-sectional view taken along line 7—7 of FIG. 6 showing an alternate embodiment of the coupling shown in FIG. 4.

Configurations of two suitable coupling members are shown in FIGS. 4 and 7 to be described below.

Figures 1, 2:
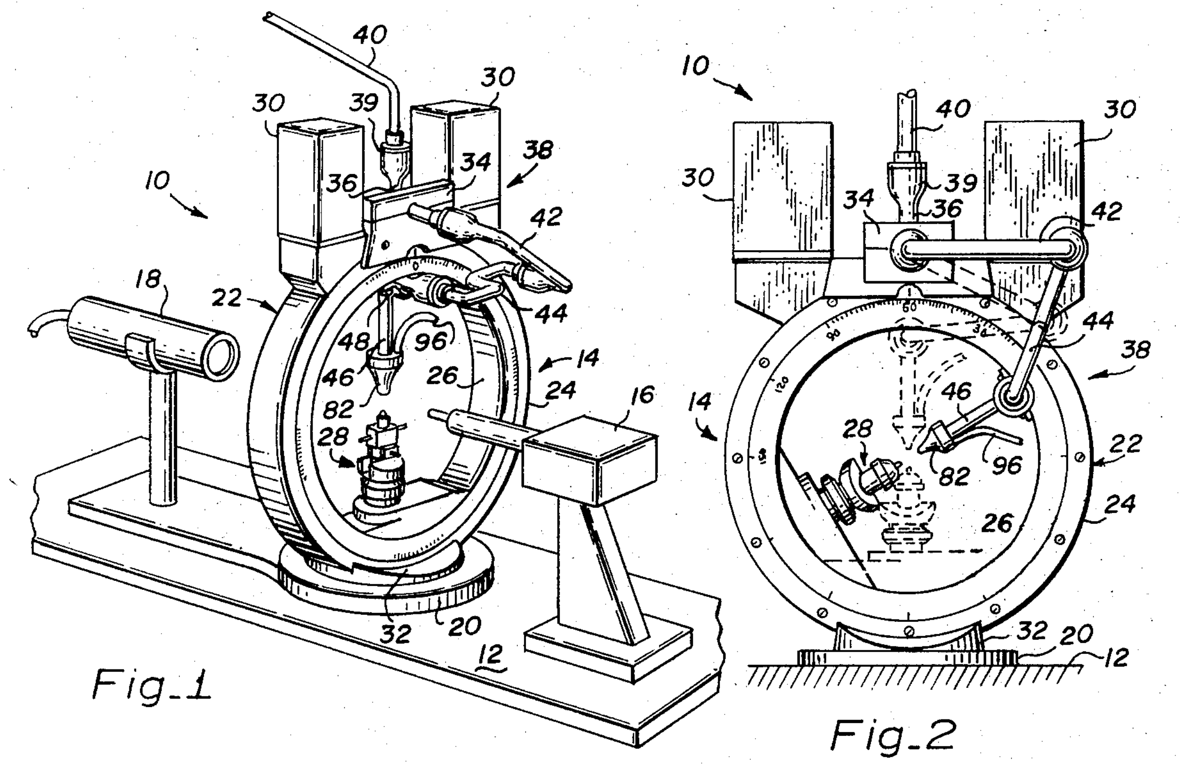
FIG. 1 is a perspective view of an X-ray diffractometer showing one embodiment of the cooling means in a first position.
FIG. 2 is an elevational view of the full-circle goniometer assembly of the X-ray diffractometer of FIG. 1 showing, in dotted outline, the cooling means and the goniometer head as positioned in FIG. 1, and additionally showing the goniometer head and the cooling means in a position different from the FIG. 1 position, such change in position resulting from the movement of the inner and outer rings of the full-circle goniometer assembly.

As shown in FIG. 1, and in dotted outline in FIG. 2, the longitudinal axis of the output end 60 of output member 46 is such that it is always aligned in a fixed relationship, generally along, the $\phi$-axis on which the crystal being analyzed is mounted. As the inner ring 26 of goniometer assembly 14 is rotated, for example, to move goniometer head 28 to the position as shown in FIG. 2, the longitudinal axis of portion 60 of output member 46 remains in the fixed relationship with the $\phi$-axis because of the four-arm configuration of cooling means 38. By use of this configuration, the mounted crystal will be uniformly bathed in the flow of the cooling fluid and, thus, uniformly cooled. This is achieved, however, without need for complex cooling arrangements or enclosures which, as indicated above, undesirably restrict access to the mounted crystal.

Referring to FIG. 4, there is seen one embodiment of a suitable gasket or coupling member 58 which can be utilized to join the various members of the cooling means 38 of the present invention. Coupling member 58 is a unitary member of generally cylindrical configuration, having one end 62 which is adapted to receive, and tightly hold, the smaller diameter end of input member 36 or arm 44. Cylindrical portion 62 terminates in a flange 64 perpendicular thereto which serves to stop the movement of an enlarged portion (for example, portion 48) over the coupling member. The portion 66 of the coupling member which is positioned between the two ends of the members being joined is also of essentially cylindrical configuration having a cylindrical portion 68 which is of greater inside diameter than cylindrical portion 62. A set of ridges 70 encircle the inside surface of cylindrical portion 68 to provide contact surfaces having an inside diameter equivalent, or essentially equivalent, to that of cylindrical portion 62. When the smaller end of input member 36 is inserted into coupling member 58 it is held firmly by ridges 70 and cylindrical portion 62. Offset from ridges 70 are a series of ridges 72 which encircle the outer surface of cylindrical wall 68 and make contact, and tightly hold, the inner surface of enlarged portion 48. The ridges are offset to give a degree of flexibility to the coupling member which enables the coupling member to be slightly deformed as the adjacent members of the cooling means are held thereby at ambient temperature. During cooling, not only will the joined members of the cooling means contract, but so will the coupling member itself. The overall effect of the change in dimensional configuration due to such cooling will be to ease the degree of deformation of the coupling member, whereby the joined members will still be tightly held, and can be freely rotated during movement of the goniometer assembly. The offset ridges additionally define annular pockets 74 and 76 which serve to segment the overall temperature gradient between the temperature of the cooling fluid (for example, at zone 78) and ambient temperature adjacent cylindrical portion 62 into a plurality of smaller temperature gradients. In this manner, the overall temperature gradient between ambient temperature and the temperature of the cooling fluid is reduced so undesirable frosting on the outside surface of the coupling member does not occur.

Figure 5:
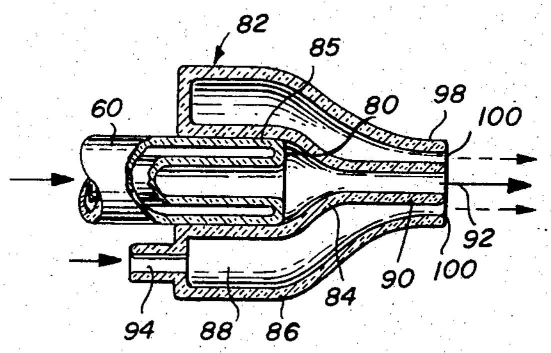
FIG. 5 is a cross-sectional view taken along line 5—5 of FIG. 3 showing the structure of the nozzle attachment which surrounds the outlet port of the output member.
Figure 8:
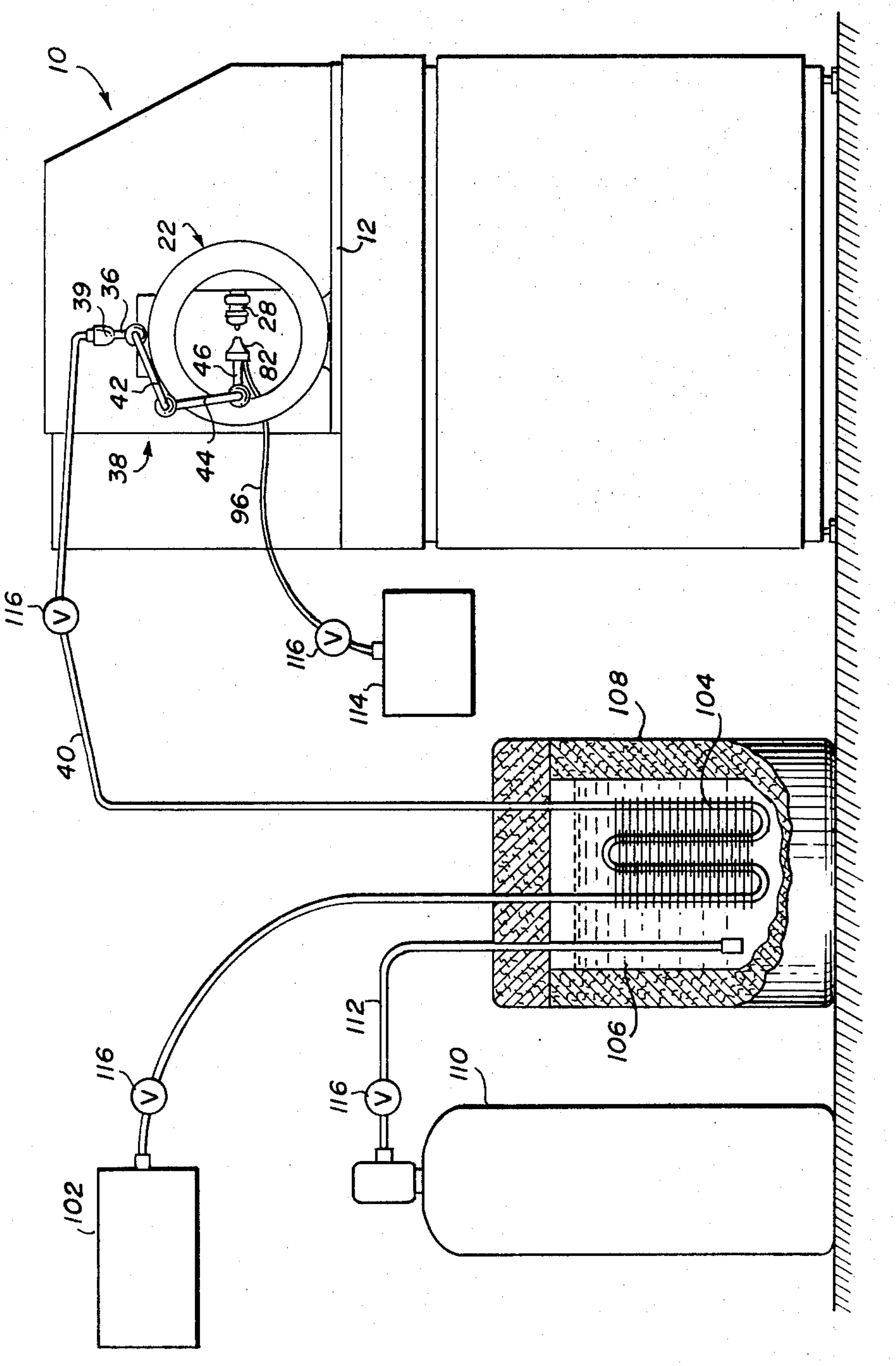
FIG. 8 is an schematic view of the X-ray diffractometer showing the entire cooling system including the heat exchanger to which the cooling means is connected via a supply conduit.

As shown in FIG. 5, there is provided about the outlet end 80 of output member 46 a nozzle attachment 82 having an inner wall 84 and an outer wall 86 to thereby define hollow interior 88 therebetween. The outer surfaces of inner wall 84 define a cylindrical bore 85 into which the terminal end 80 of output member 46 can be inserted and tightly held. The internal diameter of inner wall 84 is reduced as at 90 to define a narrow opening 92 through which the cooling fluid flows as it exits output member 46 of cooling means 38. Nipple 94 provides an opening to hollow interior 88 and can be connected to a source of dry gas via its own supply conduit 96 (for example, as shown in FIGS. 1, 2 and 8). Outer wall 86 also has a reduced diameter as at 98 to provide an annular opening 100 through which the flow of dry gas exits from hollow interior 88. By properly adjusting the respective flow rates of the cooling fluid and the dry gas, there is provided an annular sheath of dry gas surrounding the cylindrical flow of cooling fluid. Thus, as the cooling fluid and the dry gas pass around the mounted crystal, there will be little or no contact of the cooling fluid with the humidified ambient atmosphere whereby undesirable frosting on the surface of the mounted crystal will not occur. To the extent that the flow rate of the cooling fluid itself can be adjusted to prevent frosting or condensation on the surface of the mounted crystal, without need for the nozzle attachment and the annular sheath of dry gas, or a dry gas flushed environmental chamber is provided, such nozzle attachment, etc. can be omitted; however, as a purely precautional measure, it is presently preferred to provide such means and thereby positively ensure that undesirable frosting will not occur.

Figure 6:
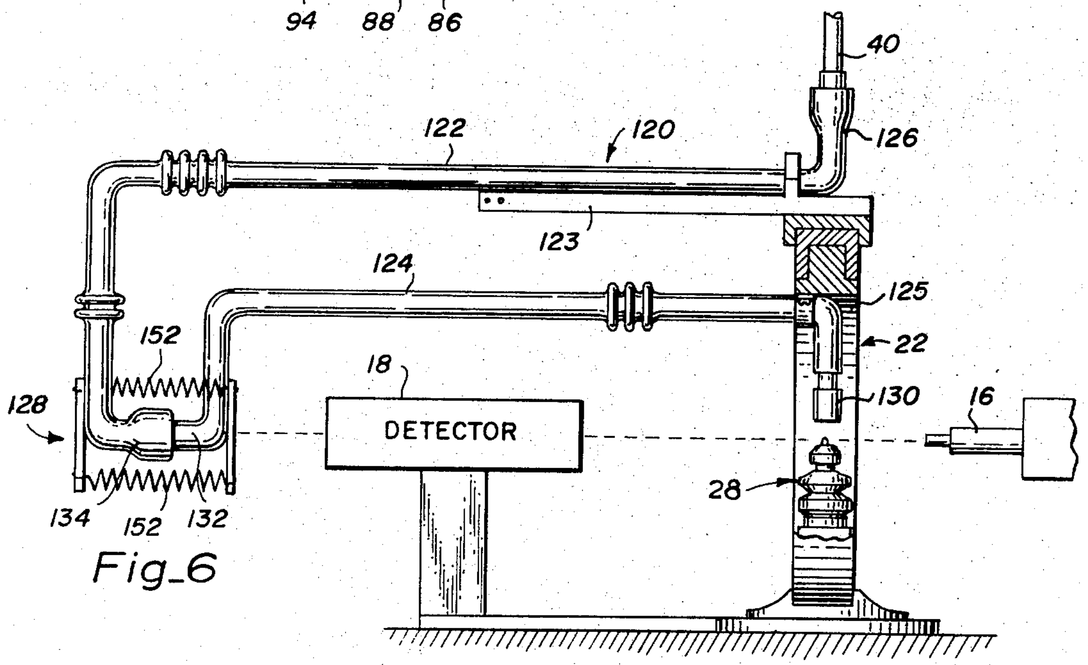
FIG. 6 is a side elevational view, partially in cross-section, of the X-ray diffractometer of FIG. 1 showing an alternate embodiment of the cooling means of FIGS. 1–3.

An alternate embodiment of the cooling means of FIGS. 1-3 is shown in FIG. 6 wherein cooling means 120 has an input member 122 secured by bracket 123 to the outer ring of full-circle 22 and a movable output member 124 secured by bracket 125 to the movable inner ring of full-circle 22. Input member 122 is connected at one terminal end 126 to supply conduit 40. Input member 122 and output member 124 are joined together at joint 128 which lies along the chi-axis of the diffractometer, the axis also passing through the mounted crystal supported by goniometer head 28. Cooling means 120 is so mounted that joint 128 remains aligned with the aforementioned chi-axis at all times during rotation of one or all of the rotatable axis of the goniometer assembly and/or detector 18. Output member has output end 180 which is always aligned in a fixed relationship, generally along, the $\phi$-axis on which the crystal is mounted. Nozzle attachment 82 can be provided on the output end 130 of cooling means 120, if desired. As with the cooling means of FIGS. 1-3, the use of the cooling means of this figure enables the mounted crystal to be uniformly bathed in the flow of the cooling fluid and, thus, uniformly cooled. Access to the mounted crystal is not restricted and such cooling is achieved without complex cooling arrangements or enclosures.

Joint 128 is shown in greater detail in FIG. 7 wherein input arm 122 having enlarged portion 134 is shown surrounding the smaller diameter end 132 of output member 124. The gasket or coupling member of this figure has two component parts including a member 136 mounted on the inside wall 138 of enlarged portion 134, and member 140 mounted on the outside surface 142 of output member 124. Members 136 and 140 can be constructed of any suitable material; however, as with the unitary gasket of FIG. 4, it is presently preferred to use a self-lubricating material, such as Teflon, for the reason specified above. Member 136 has a conical bore therethrough such that the diameter of the bore at end 144 thereof which first receives output member 124 is greater than the diameter at the other end 146 thereof. About the outer cylindrical surface of member 136 is a cavity 148 which defines an annular air pocket utilized to segment the overall temperature gradient between the cooling fluid and ambient temperature into two discrete smaller temperature gradients. Member 140, which is essentially frusto-conical in shape, has a cylindrical bore therethrough. The bore is of the same diameter of slightly smaller than the outside diameter of output member 124 so as to tightly fit on end 132 of output member 124 which is inserted into enlarged portion 134. The base (i.e., the larger diameter plane) of the frusto-conical shaped member 140 is at the end of the member remote from the end which is first inserted into enlarged portion 134. The surface of member 140 generally bounded by the cylindrical bore has two encircling notches 150 formed therein, which define annular cavities surrounding output member 124, so as to additionally segment the overall temperature gradient between ambient temperature and the temperature of the cooling fluid. Spring means 152 supported by annular bracket 154 mounted on input member 122 and bracket 156 mounted on output member 124 continuously urge gasket member 140, tightly held on output member 124, into firm and fluid-tight contact with gasket member 136 supported by input member 122. The advantage of this particular gasket combination is that as the joint changes dimensional configuration, due to changes in temperature, a fluid-tight condition is always maintained due to the urging of springs 152. That is, fluid-tight contact between the adjacent contacting surfaces of gasket members 136 and 140 is maintained at all times, notwithstanding wide variation in the temperature of the joint due to particular selected operating conditions different from ambient temperature.

Referring to FIG. 8, there is shown a schematic representation of an X-ray diffractometer 10 and the cooling system to which cooling means 38 of the present invention is connected. Specifically, cooling means 38 is connected via supply conduit 40 to a source 102, for example, of dry nitrogen gas. Supply conduit 40 passes through heat exchanger 104 which is immersed in a bath 106 of liquid nitrogen held in container 108. Appropriate sensors (not shown) are provided inside container 108 to ensure that heat exchanger 104 is, at all times, totally immersed in the liquid nitrogen. The liquid nitrogen is supplied from source 110 via supply conduit 112. Nozzle attachment 82 on cooling means 38 is connected via supply conduit 96 to a source 114, for example, of dry air. Supply conduits 40, 96 and 112 are provided with appropriate valves 116 to control the flow of the various fluids through the respective conduits, etc. A heating coil (not shown) is provided in supply conduit 40 between the heat exchanger and the cooling means to regulate the temperature of the cooling fluid. Detector 18 as shown in FIG. 1 is at the 2$\phi$-zero position which, as is known in this art, is in the bisecting mode of data collection. In addition, if desired, detector 18 can be on the same side of full-circle 22 as the X-ray source 16, also as is known in this art as the parallel mode of data collection. The detector is rotated to the desired data-collecting positions by known means conventional in this art. The cooling means of the present invention, as represented by either embodiment shown herein, is fully compatible with such positioning and does not interfer with data collection.

Figure 9:
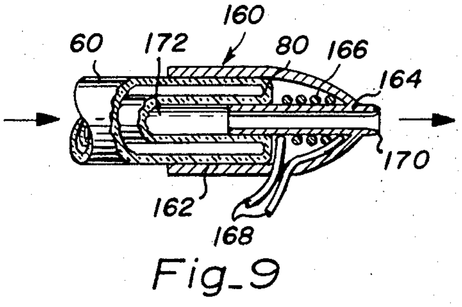
FIG. 9 is a side elevational view, substantially in cross-section, showing the structure of an alternate nozzle attachment which surrounds the outlet port of the output member.

Referring to FIG. 9, there is shown nozzle attachment 160 adapted to have outer wall 162 fit tightly about the outlet end 80 of output member 46. Outer wall 162 decreases in diameter and, adjacent output end 170 thereof, connects to cylindrical inner wall 164 which is adapted to fit tightly with bore 172 of output member 46. Heating coil 166, connected by leads 168 to a source (not shown) of electrical current, surrounds cylindrical inner wall 164 in the zone between the inner and outer walls. As the cooling fluid flows through the bore of nozzle attachment 160, the outer skin of the coooling fluid is heated to a temperature above the temperature of the central core of the fluid stream to thereby provide a hot annular skin of dry gas surrounding the cooler central core of the flowing cooling fluid stream. This hotter outer skin prevents mixing of the cooler central core of the fluid stream with the humidified ambient atmosphere, and thereby prevents frosting on the surface of the mounted crystal. This attachment has the advantage, over the attachment of FIG. 5, that there is no need to adjust the flow rates of two different fluids to ensure that mixing of the humidified atmosphere and the cooling fluid, and, therefore, frosting does not occur.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation material or composition of matter, process, process step or steps, or then-present objective to the spirit of this invention without departing from its essential teachings.

What is claimed is:

1. An X-ray diffractometer comprising a goniometer assembly including a full-circle having an outer ring and a movable inner ring, and a rotatable goniometer head mounted on said movable inner ring for holding and supporting a crystal to be analyzed; an X-ray source for directing a beam of X-radiation at the mounted crystal; detector means for receiving and measuring the intensity of the X-ray beam diffracted by the mounted crystal; and means mounted on said full-circle for directing the flow of a cooling fluid about the mounted crystal, said means comprising an input member secured to said outer ring of said full-circle and an output member secured to said movable inner ring of said full-circle, said output member having a component part thereof directed so that fluid flow therefrom is at all times in a fixed relationship with the $\phi$-axis of said X-ray diffractometer on which the crystal is mounted whereby, during cooling, the mounted crystal is uniformly bathed in the flow of the cooling fluid.

2. The X-ray diffractometer of claim 1 wherein said fluid flow directing means and said goniometer head are free of an enclosure surrounding the mounted crystal.

3. The X-ray diffractometer of claim 1 wherein said input member and said output member are each of double-walled construction with flow of the cooling fluid therethrough being along the path defined by the inner walls.

4. The X-ray diffractometer of claim 1 further including means for connecting said input member to a source of dry cooling fluid.

5. The X-ray diffractometer of claim 1 further including means for connecting said input member to a source of dry gas, and means for regulating the temperature of said dry gas to a temperature below room temperature.

6. The X-ray diffractometer of claim 1 further including a nozzle attachment on the output end of said output member, said nozzle attachment adapted to provide an annular sheath of relatively warm dry gas about the relatively cooler cooling fluid as the cooling fluid flows from said output member to and around the mounted crystal, the annular sheath of relatively warm dry gas serving to exclude moisture in the ambient atmosphere from the zone about the mounted crystal whereby undesirable frosting does not occur.

7. The X-ray diffractometer of claim 6 further including means to connect said nozzle attachment to a source of dry gas.

8. The X-ray diffractometer of claim 1 wherein said X-ray diffractometer is enclosed within a dry gas flushed environmental chamber.

9. The X-ray diffractometer of claim 1 wherein said component part of said output member is directed so that flow of the cooling fluid is along the $\phi$-axis.

10. The X-ray diffractometer of claim 1 wherein said input member and said output member are joined to each other at a rotatable joint along an imaginary line passing through the mounted crystal and along the chi-axis of said diffractometer.

11. The X-ray diffractometer of claim 10 wherein said detector is positioned between said rotatable joint and the mounted crystal.

12. The X-ray diffractometer of claim 10 wherein said input member and said output member are connected to each other at said rotatable joint by a coupling which maintains a fluid-tight condition along the flow path of the cooling fluid, yet permits 360° rotation of said input member and said output member as said goniometer assembly is moved to different data-collecting positions.

13. The X-ray diffractometer of claim 12 wherein said coupling includes means to segment the overall temperature gradient between ambient temperature and the temperature of the cooling fluid flowing through said rotatable joint into a plurality of smaller discrete temperature gradients, whereby undesirable frosting does not occur on the outside of said joint.

14. The X-ray diffractometer of claim 1 wherein said input member and said output member are connected together by an intermediate two-bar linkage having a first arm and a second arm, said two-bar linkage and said input and output members associated therewith enabling said goniometer assembly to be rotated to a variety of data-collecting positions while said component part of said output member remains at all times in said fixed relationship with the $\phi$-axis of said X-ray diffractometer.

15. The X-ray diffractometer of claim 14 wherein said input member and said first arm of said two-bar linkage, said first arm and said second arm of said two-bar linkage, and said second arm and said output member are each connected together by a coupling at a rotable joint, each of said couplings maintaining a fluid-tight condition along the flow path for the cooling fluid, yet permitting 360° rotation of the joined members as said goniometer assembly is moved to different data-collecting positions.

16. The X-ray diffractometer of claim 15 wherein each of said couplings includes means to segment the overall temperature gradient between ambient temperature and the temperature of the cooling fluid flowing through said rotatable joint into a plurality of smaller discrete temperature gradients, whereby undesirable frosting does not occur on the outside of said joint.

17. Means for directing the flow of a cooling fluid about a mounted crystal in an X-ray diffractometer, the X-ray diffractometer including a goniometer assembly including a full-circle having an outer ring and a movable inner ring and a rotable goniometer head mounted on the movable inner ring for holding supporting a crystal to be analyzed; said flow directing means comprising an input member adapted to be secured to the outer ring of the full-circle and an output member adapted to be secured to the movable inner ring of the full-circle, said output member having a component part thereof directed so that flow of the cooling fluid therefrom is at all times in a fixed relationship with the $\phi$-axis of the X-ray diffractometer on which the crystal is mounted, whereby, during cooling, the mounted crystal is uniformly bathed in the flow of the cooling fluid, said flow directing means being free of an enclosure completely surrounding the mounted crystal closely adjacent thereto.

18. The means of claim 17 wherein said component part of said output member is so directed that flow of the cooling fluid therefrom is along the $\phi$-axis.

19. The means of claim 17 wherein said input member and said output member are connected to each other at a rotatable joint by a coupling which maintains a fluid-tight condition along the flow path of the cooling fluid, yet permits 360° rotation of said input member and said output member as the goniometer assembly is moved to different data-collecting positions.

20. The means of claim 19 wherein said coupling includes means to segment the overall temperature gradient between ambient temperature and the temperature of the cooling fluid flowing through said rotatable joint into a plurality of smaller discrete temperature gradients, whereby undesirable frosting does not occur on the outside of said joint.

21. The means of claim 17 wherein said input member and said output member are connected together by an intermediate two-bar linkage having a first arm and a second arm, said two-bar linkage and said input and output members associated therewith enabling the goniometer assembly of the X-ray diffractometer to be rotated to different data-collecting positions while said component part of said output member remains at all times in said fixed relationship with the $\phi$-axis.

22. The means of claim 21 wherein said input member and said first arm of said two-bar linkage, said first arm and said second arm of said two-bar linkage, and said second arm and said output member are each connected together by a coupling at a rotable joint, each of said couplings maintaining a fluid-tight condition along the flow path for the cooling fluid, yet permitting 360° rotation of the joined members as the goniometer assembly is moved to different data-collecting positions.

23. The means of claim 22 wherein each of said couplings includes means to segment the overall temperature gradient between ambient temperature and the temperature of the cooling fluid flowing through said rotatable joint into a plurality of smaller discrete temperature gradients, whereby undesirable frosting does not occur on the outside of said joint.

24. The means of claim 17 further including a nozzle attachment on the output end of said output member, said nozzle attachment adapted to provide an annular sheath of relatively warm dry gas about the relatively cooler cooling fluid as the cooling fluid flows from said output member to and around the mounted crystal, the annular sheath of relatively warm dry gas serving to exclude moisture in the ambient atmosphere from the zone about the mounted crystal whereby undesirable frosing does not occur.

25. The means of claim 19 wherein said rotatable joint lies along an imaginary line passing through the mounted crystal and along the chi-axis of the X-ray diffractometer.

* * * * *